US006483500B1

(12) United States Patent
Choi et al.

(10) Patent No.: US 6,483,500 B1
(45) Date of Patent: Nov. 19, 2002

(54) COMPUTER SYSTEM WITH JOG DIAL FUNCTION AND THE USER INTERFACE SCHEME THEREOF

(75) Inventors: Seung-Beom Choi; Kwang-Sik Lee, both of Kyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/210,614

(22) Filed: Dec. 14, 1998

(30) Foreign Application Priority Data

Dec. 13, 1997 (KR) ............................................. 97-68430
Jul. 14, 1998 (KR) ............................................. 98-28457

(51) Int. Cl.[7] ................................................ G09G 5/00
(52) U.S. Cl. ...................................... 345/184; 345/156
(58) Field of Search ................................ 345/168, 335, 345/352, 353, 184, 156; 341/21, 22; 701/3, 28

(56) References Cited

U.S. PATENT DOCUMENTS

| | | | |
|---|---|---|---|
| 4,107,784 A | | 8/1978 | Van Bemmelen ............ 364/900 |
| 4,112,429 A | | 9/1978 | Tsuha et al. ............. 340/365 R |
| 5,121,477 A | | 6/1992 | Koopmans et al. .......... 395/156 |
| 5,610,601 A | * | 3/1997 | Lahti et al. .................... 341/22 |
| 5,786,811 A | | 7/1998 | Jaeger ......................... 345/172 |
| 5,798,752 A | * | 8/1998 | Buxton et al. ............... 345/146 |
| 5,798,760 A | * | 8/1998 | Vayda et al. ................. 345/352 |
| 5,821,926 A | | 10/1998 | Arita ........................... 345/333 |
| 5,973,666 A | * | 10/1999 | Chanllender et al. ....... 345/146 |
| 6,034,688 A | * | 3/2000 | Greenwood et al. ........ 345/353 |
| 6,072,483 A | * | 6/2000 | Rosin et al. ................. 345/335 |
| 6,115,029 A | * | 9/2000 | Jaaskelainen, Jr. et al. . 345/159 |
| 6,128,553 A | * | 10/2000 | Gordon et al. ................ 701/3 |

* cited by examiner

Primary Examiner—Amare Mengistu
(74) Attorney, Agent, or Firm—Robert E. Bushnell, Esq.

(57) ABSTRACT

A computer system includes a control panel having a rotary switch and a plurality of push button switches provided in the front bezel of the computer main body. The rotary switch uses a well-known endless loop type rotatable switch, called "jog dial". The jog dial is used for selecting an application program among a plurality of programs stored in the computer. Also, the button switches are used for performing a specific function relative to the control panel. A microcontroller is provided to produce predefined key scan code data corresponding to each switch signal input from the control panel. The computer system determines whether a key scan code data corresponding to the operation of the control panel is inputted and produces a command for performing a function corresponding to the rotation of the rotary switch or the pressing of the button switches. Provided is a shell program stored in a memory of the system host, for displaying a program selection menu window on the computer monitor when the key scan code data is received by the system host, for executing an application program by the command produced in the computer system. The invention provides an effective user interface since selecting, executing, and ending of a desired application program are possible in a more convenient manner through operation of the control panel. Further, registration of a new program menu item as well as the editing and deleting of the registered program menu are possible through the mouse operation.

42 Claims, 16 Drawing Sheets

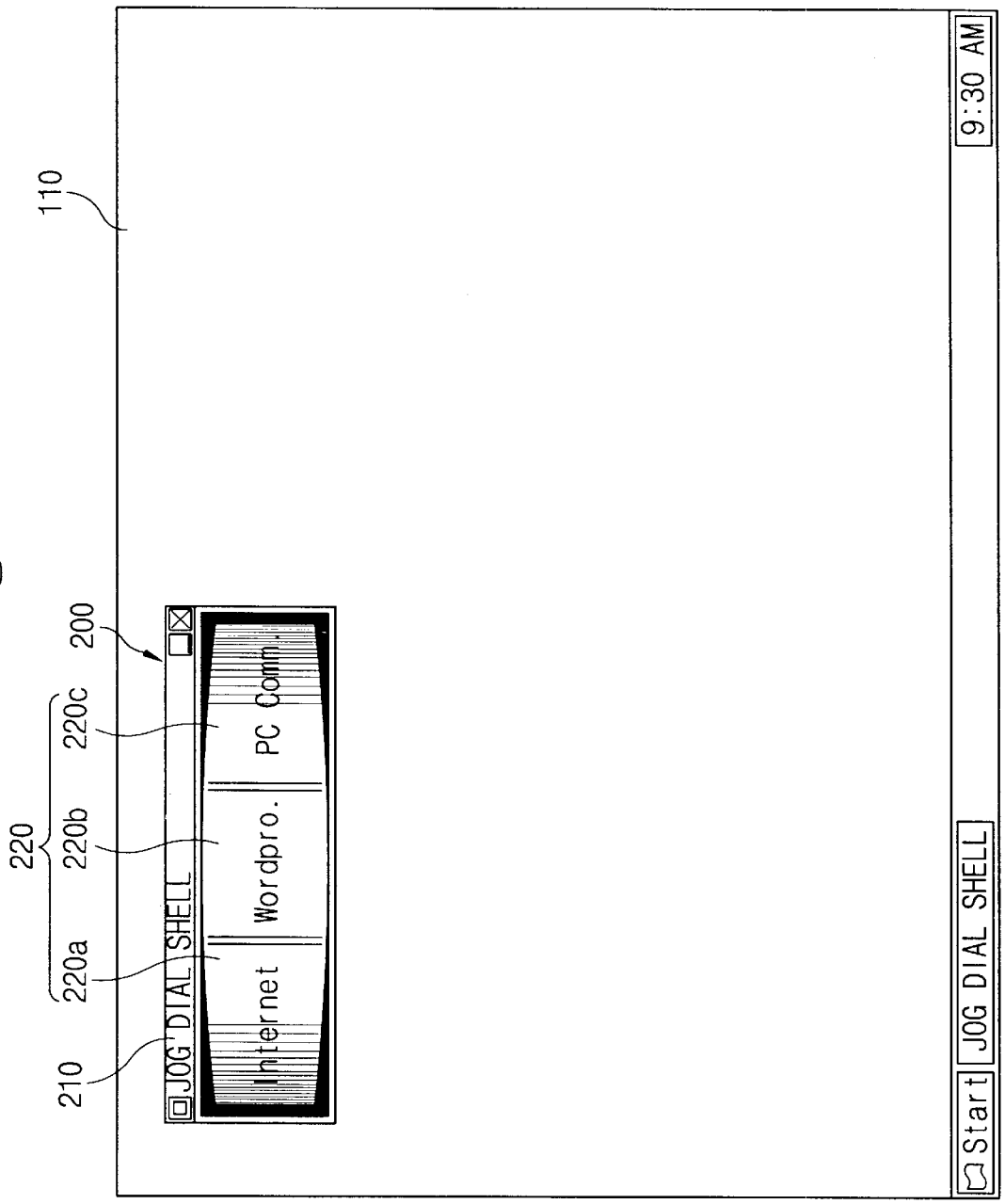

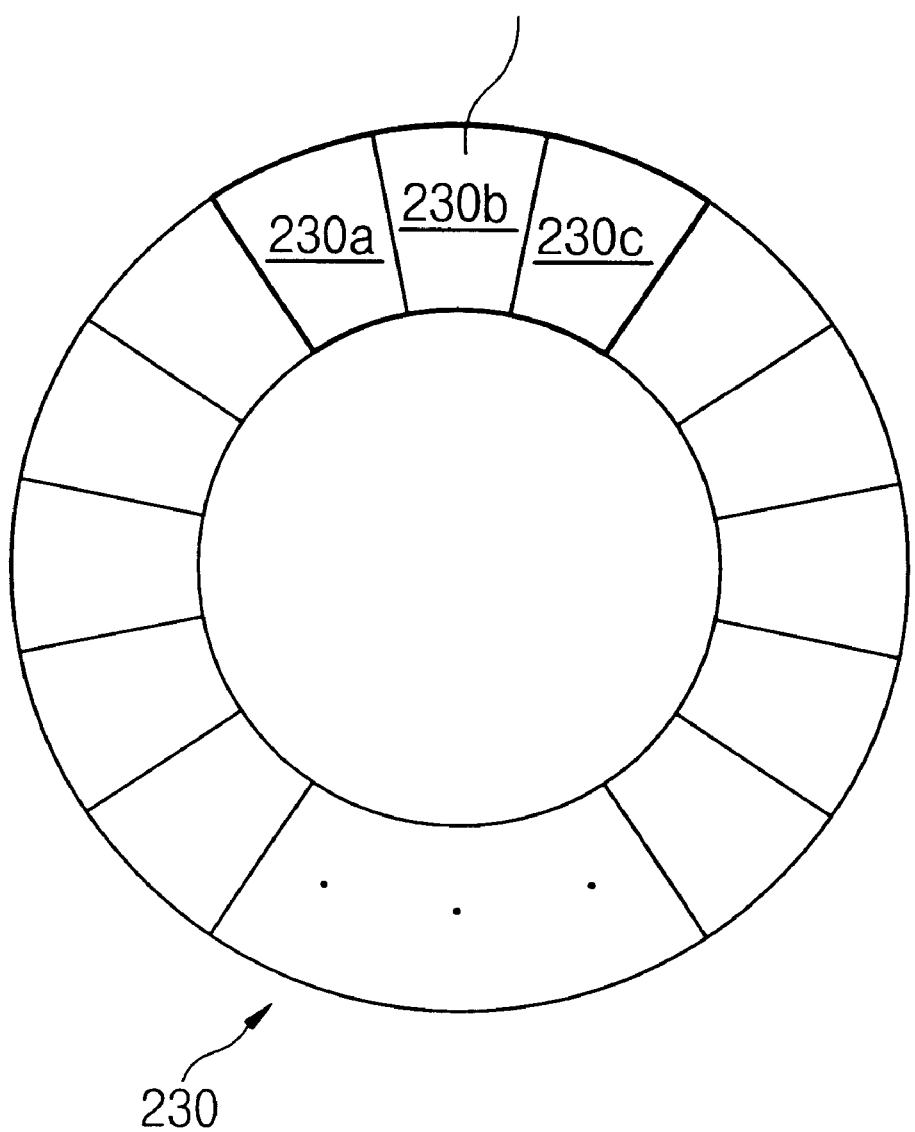

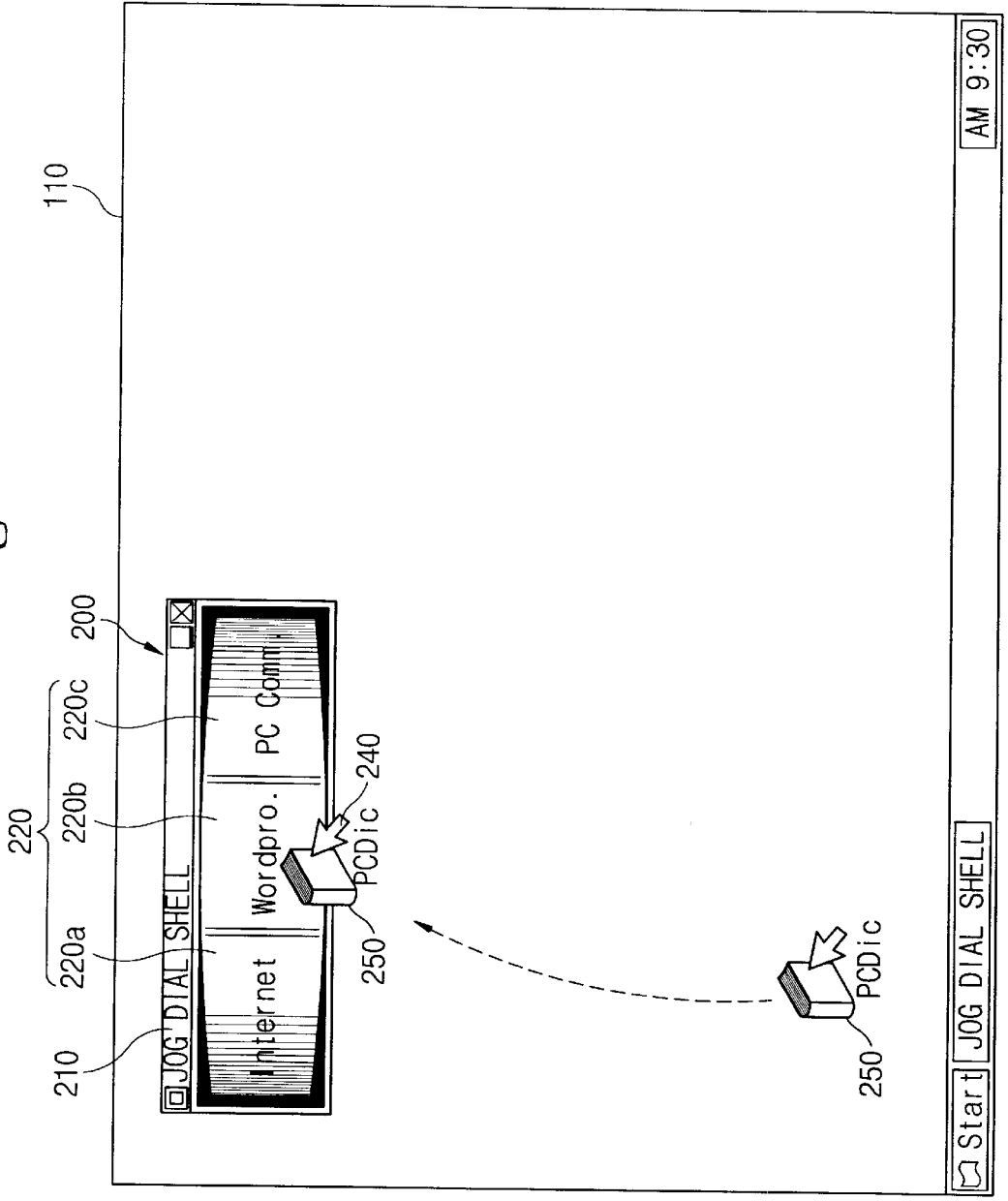

COMPUTER SYSTEM WITH JOG DIAL FUNCTION AND THE USER INTERFACE SCHEME THEREOF

CLAIM OF PRIORITY

This application makes reference to, incorporates the same herein, and claims all benefits accruing under 35 U.S.C. §119 from an application entitled COMPUTER SYSTEM HAVING JOG DIAL FUNCTION earlier filed in the Korean Industrial Property Office on the Dec. 13, 1997, and there duly assigned Serial No. 97-68430, and from an application entitled A USER INTERFACE METHOD OF USING JOG-DIAL FUNCTION earlier filed in the Korean Industrial Property Office on the Jul. 14, 1998, and there duly assigned Serial No. 98-28457, copies of which are annexed hereto.

BACKGROUND OF THE INVENTION

Technical Field

The present invention relates to a computer system, and more particularly to a computer system having a control panel that allows selection of an application program installed in the computer and execution thereof and to a user interface method for the same.

Related Art

Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem, a hard disk storage device, and a printer. A computer system's main board, which is a printed circuit board known as a motherboard, is used to electrically connect these components together.

The central processing unit is often described as a microprocessor. The microprocessor is an electronic component having internal logic circuitry handling most, if not all, the data processing in the computer system. The internal logic circuitry of microprocessors is typically divided into three functional parts known as the input/output (I/O) unit, the control unit, and the arithmetic-logic unit (ALU). These three functional parts interact together and determine the power and performance of the microprocessor. The combination of the control unit and the arithmetic-logic unit can be referred to as the central processing unit. Also, the combination of the input/output unit, the control unit, and the arithmetic-logic unit can be referred to as the central processing unit.

Computer systems include a basic input output system (BIOS) which is an especially important program stored in read only memory (ROM). The basic input output system (BIOS) tests a computer every time the computer is powered on. The basic input output system (BIOS) can allocate a computer system's resources automatically, making adjustments needed to accommodate new hardware. Also, the basic input output system (BIOS) governs how system board components interact.

When the computer system is powered on, the basic input output system (BIOS) immediately takes control of the computer system and its components. The first duty of the basic input output system (BIOS) is to perform a series of diagnostic routines called the power on self test (POST) routine, which ensures that every part of the computer system's hardware is functioning properly.

In the personal computer system, there are many methods of executing a command or an application program depending on the operating system used in a computer system and its user interface method. Operating systems used in state-of-art personal computers adopt so-called graphic user interface (GUI). This graphic user interface has made a great contribution to the computing environment for its convenience in using the computer. For example, in the Windows (R) operating system developed by Microsoft(R) Corporation, an application can be executed by selecting the corresponding icon placed on the Desktop or by exploring the File Manager or Explorer through mouse or keyboard operation. Basically, present operating systems adopting the GUI designate icons relative to every tile or documents and icons are displayed on the monitor screen so that the user may select the desired one and execute it by clicking the mouse button.

In such an operating system, however, if many program icons are placed on the Windows Desktop or a program group window, those icons may cause inconvenience to a user in selecting a desired one among many icons. Further, if an icon corresponding to the desired application program is not presented in the Desktop, it is difficult for a novice to find the desired program in the Windows Explorer and to execute the very program.

Recently, in order to facilitate execution of frequently used application programs, provisions are made to the personal computer such that a control panel, having a plurality of buttons called "Easy Button" or "Q button," are provided in the front panel of the computer main body. Such buttons may be the one incorporated into a remote control device of the computer. Each button of the control panel is designated by a particular function of the computer or common application program. By pressing a button, starting or ending of an application program is possible.

However, although the above-noted control panel provides the user with easy and quick access to the computer, the inherent problem is that it has limitation in number of the button. Further, since designation of the functional button has been determined by the computer manufacturer, the computer user could not change the button designation at will. If it is possible to provide more buttons with the front control panel, then too many buttons will cause inconvenience to a user as like many icons registered in the Windows Desktop. Furthermore, the above-noted control panel lacks the ability to choose a main menu or control menu of the selected application program through the button operation.

I have found that a simplified and convenient access apparatus and method for a computer system would be desirable. Efforts have been made to develop devices and methods related to electrical systems and computer systems.

Exemplars of recent efforts in the art include U.S. Pat. No. 5,821,926 for METHOD OF GENERATING AN OPERATING BUTTON FOR COMPUTER PROCESSING, METHOD OF RETRIEVING DATA WITH THE OPERATING BUTTON AND METHOD OF DISPLAYING THE OPERATING BUTTON issued to Arita, U.S. Pat. No. 5,786,811 for OPERATOR/CIRCUIT INTERFACE WITH INTEGRATED DISPLAY SCREEN issued to Jaeger, U.S. Pat. No. 5,121,477 for SYSTEM FOR INTERACTIVELY CREATING ACTION BAR PULL-DOWN WINDOWS OF A USER INTERFACE FOR USE AT PROGRAM RUN TIME issued to Koopmans et al., U.S. Pat. No. 4,112,429 for MULTIFUNCTION SEQUENCE OPERATED INTEGRATED SWITCH-DISPLAY DEVICE issued to Tsuha et al., and U.S. Pat. No. 4,107,784 for MANAGEMENT CONTROL TERMINAL METHOD AND APPARATUS issued to Van Bemmelen.

While these recent efforts provide advantages, I note that they fail to adequately provide a simplified and convenient access apparatus and method for a computer system. Thus, there is a need of an improved computer control panel, capable of selecting and executing an application program more efficiently, to improve user interface provided by the computer control panel.

SUMMARY OF THE INVENTION

It is therefore an object of the present invention to provide a computer system having an improved user interface which can select and execute a desired application program among many programs, and registration of a new program menu item as well as edition of the registered program menu can be performed by a user.

It is another object of the invention to provide a computer system having a control panel which can select a menu or submenu of an executed program through operation of the control panel.

In accordance with the present invention, the computer system comprises a control panel having a rotary switch and at least one push button switch; a microcontroller in response to input signals fed from the switches of said control panel to produce predefined key scan code data corresponding to each switch signal; a host system for determining whether a key scan code data corresponds to the key operation of the control panel is inputted to produce a command for performing corresponding function as to the rotation of the rotary switch or pressing of the button switches; and a shell program stored in a memory of the host system for being invoked when said key scan code data is received by the system host and for displaying a menu window in a display monitor, through which selective execution of an application program is possible by the command produced in the host system.

In the preferred embodiment of the invention, the predefined key scan code data is sent to the system host through keyboard data/clock line of a keyboard controller.

Further, the control panel is mounted in the front bezel of the computer main body and the rotary switch includes at least two signal output terminals to produce different pulse signals therefrom as it is rotated either in clockwise or counter-clockwise direction. The control panel further includes other push button switches provided adjacent to the rotary switch for performing a specific function of the system host.

The program selection menu window of this invention has a dial-like form extending along the horizontal side thereof and divided into three sections, each of which are designated by names of an application program (a menu item) that is being registered in the shell program. Further, the menu item is registered in each of program registration sections of the loop type data format provided in the shell program.

According to another aspect of this invention, an interface method for use in a computer system is provided, the computer system includes a control panel which has a rotary switch and at least one push button switch for selectively executing an application program stored in the computer, the method comprises the steps of determining whether an input exists from the control panel; varying contents of a menu window for selecting a command for executing an application in response to rotational direction of the rotary switch, if the control panel input corresponds to the rotary switch; and performing a function designated by the push button switch of the control panel, if the control panel input corresponds to the push button switch, wherein at least one push button switch is designated for execution of the command selected by the rotary switch, and if a menu or submenu of the executed program is selected by the rotary switch the selected menu can be executed by the switch for execution of the command.

To achieve these and other objects in accordance with the principles of the present invention, as embodied and broadly described, the present invention provides an apparatus, comprising: a panel including at least one switch unit, said at least one switch unit outputting a plurality of switch signals in response to a user switching said at least one switch unit, said plurality of switch signals corresponding to a first operation selected from among a plurality of operations; a processing unit receiving first data corresponding to said switch signals, and outputting a command signal to perform said first operation; a video display conveying varying visual information to the user, said visual information corresponding to said plurality of operations, said first operation, and said switching of said at least one switch unit; and a memory unit being coupled to said processing unit and storing a routine, said routine being performed by said processing unit when said first data is received by said processing unit, and said routine being performed by said processing unit to convey said visual information to the user at said video display.

To achieve these and other objects in accordance with the principles of the present invention, as embodied and broadly described, the present invention provides a method, comprising: determining when a signal is output from a panel, said panel including a rotary switch and at least one push button switch; varying visual data displayed at a video display, said varying of said visual data being performed in response to a rotational movement of said rotary switch when said signal corresponds to said rotary switch, said visual data corresponding to a plurality of application programs; performing a function corresponding to said at least one push button switch when said signal corresponds to said at least one push button switch; and said at least one push button switch being designated for execution of a selected application program, said selected application program being selected from among said plurality of application programs by operation of said rotary switch.

To achieve these and other objects in accordance with the principles of the present invention, as embodied and broadly described, the present invention provides a method, comprising: determining when a signal is output from a panel of a computer system, said panel including a rotary switch and at least one push button switch; varying visual data of a menu displayed at a video display, said varying of said visual data being performed in response to a rotational movement of said rotary switch when said signal corresponds to said rotary switch, said varying of said visual data being performed to facilitate a user selecting a command from among a plurality of commands for executing an application program stored in said computer system, said visual data of said menu including said plurality of commands; and performing a function corresponding to said at least one push button switch when said signal corresponds to said at least one push button switch, said at least one push button switch being designated for execution of said command selected by the user.

To achieve these and other objects in accordance with the principles of the present invention, as embodied and broadly described, the present invention provides a method, comprising: executing an application program utilizing a panel of a computer system, said panel including a rotary switch and at least one push button switch; selecting a first menu item from among a plurality of displayed menu items of a first menu of said executed application program according to a rotational movement of said rotary switch; and executing said first menu item by pressing said at least one push button switch, wherein said at least one push button switch is designated for execution of said first menu item selected by said rotary switch.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to exemplify the principles of this invention.

FIG. 6 is a view depicting an example of the jog dial shell program window displayed in the computer monitor screen, in accordance with the principles of the present invention;

FIG. 8 is a diagram illustrating the loop type data format of the program selection menu adopted in the jog dial shell program, in accordance with the principles of the present invention;

FIG. 13 is a view depicting a method for registering a new application program into the program selection menu of the jog dial shell program, in accordance with the principles of the present invention;

DETAILED DESCRIPTION OF PREFERRED EMBODIMENTS

Figure 1:
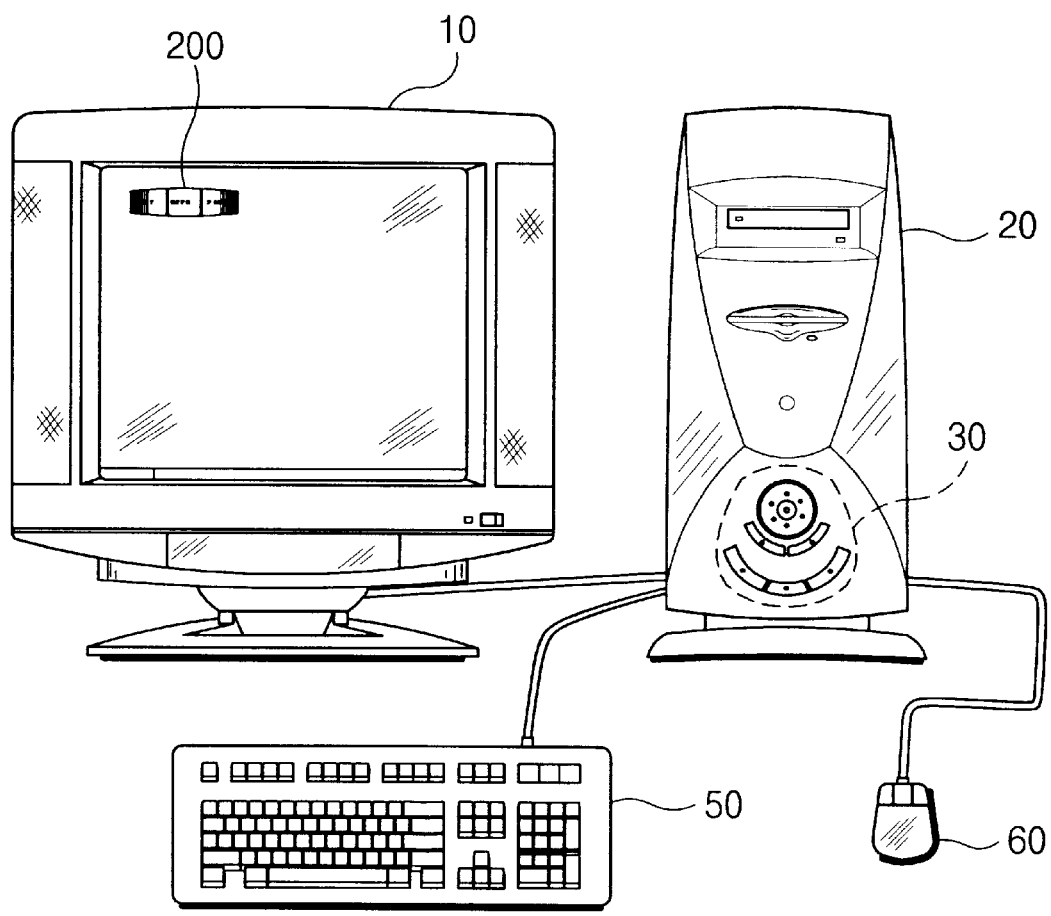
FIG. 1 is an exterior view of a computer system having a jog dial panel provided in the front panel of the computer main body, in accordance with the principles of the present invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

In the following description of the various embodiments of the present invention, it should be noted that the same reference numerals are used in the drawings where the referenced element has the same function or operation to further aid an understanding of the present invention.

FIG. 1 shows a preferred embodiment of a computer system in accordance with the invention. The computer system includes a main body 20 having a control panel 30 provided in the front panel thereof. The computer system also includes typical input/output devices such as a keyboard 50, a mouse 60, and a display monitor 10. In particular, the control panel 30 of the invention includes a plurality of key buttons and a rotary switch, which will be described later in detail. Further, the computer system stores a shell program relative to the control panel 30 in accordance with the invention. The control panel 30 invokes the shell program and the corresponding shell window 200 is displayed in the monitor screen of the monitor 10. This shell window 200 provides a particular user interface for selecting and executing an application program among a plurality of programs stored in the computer.

Figure 2:
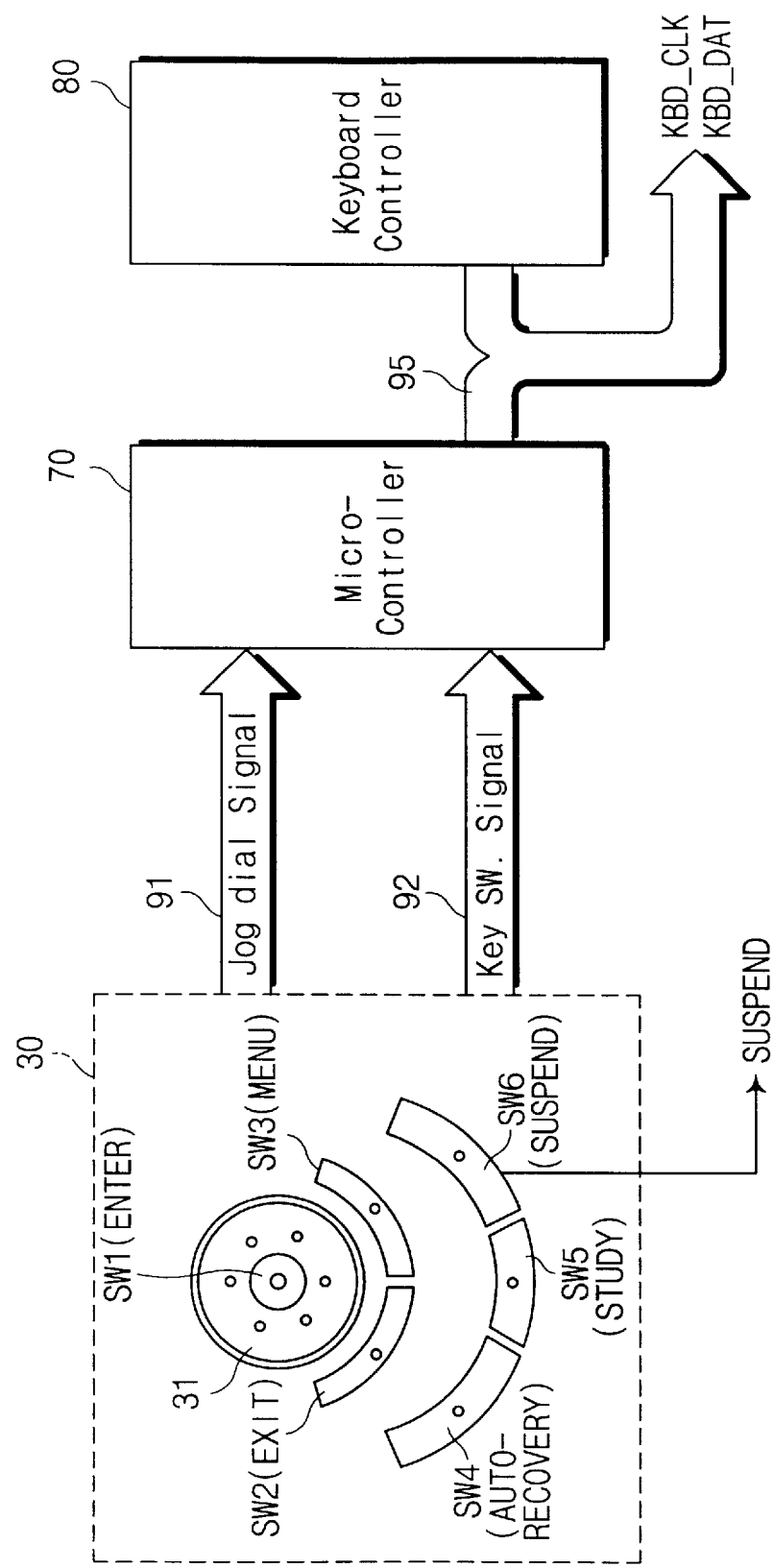
FIG. 2 is a diagram showing configuration of a jog dial panel in accordance with a preferred embodiment of the present invention.

Referring to FIG. 2, there is shown a configuration of the control panel 30 in accordance with the invention. The control panel 30 includes a rotary switch 31 and a plurality of push button switches SW1, SW2, SW3, SW4, SW5, and SW6. In this embodiment, the rotary switch 31 uses well-known endless loop type rotatable switch, called "jog dial". Usually this rotary switch 31 (hereinafter called jog dial) has two signal output terminals to produce different pulse signals therefrom as it is rotated either in clockwise or counter-clockwise direction. At the center part of the jog dial 31, a circular push button switch SW1 is provided concentrically. And at the periphery of the jog dial 31, two key buttons SW2 and SW3 are provided below the jog dial 31, and similarly three key buttons SW4, SW5, and SW6 are placed down below the jog dial 31. On the whole, the arrangement of the jog dial 31 and button switches SW1, SW2, SW3, SW4, SW5, and SW6 has a radial form.

The jog dial 31 is used for selecting an application program among a plurality of programs stored in the computer. Also, the button switches SW1, SW2, SW3, SW4, SW5, and SW6 are used for performing a specific function of the above computer system. For example, in this embodiment, the button switch SW1 provided in the center portion of the jog dial 31 is designated as an "Enter" key for executing an application program chosen by the jog dial 31. And, button switches SW2 and SW3 are designated respectively as an "exit" key and a "menu" key, for exit from the selected program and for invoking control menu of the jog dial shell program, respectively. Further, the button switch SW4 is designated as an "Auto Recovery" key for invoking a system utility program, the switch SW5 as a "Study" key for initiating a set of study program shell, and the switch SW6 as a "Suspend" key for having the computer system enter instantly the suspend mode of the system's power management system.

The signal output terminals of the jog dial 31 are connected with input terminals of a microcontroller 70 via jog dial signal line 91. Also, the signal output terminal of the push button switches SW1, SW2, SW3, SW4, and SW5 are connected with other input terminals of the microcontroller 70 via key switch signal line 92. Output terminals of the microcontroller 70 is coupled to the keyboard data/clock line 95 of a keyboard controller 80 provided in the computer system. The output terminal of the suspend key switch SW6 is directly connected to the computer system.

The microcontroller 70 converts the input signals fed from the jog dial 31 and the push button switches SW1, SW2, SW3, SW4, and SW5 into a predefined key scan code data KBD_DAT and supplies it with the system host through the keyboard data/clock line 95. The microcontroller 70 also checks, before transmission of the key scan code data, if the system's keyboard controller 80 occupies the keyboard data/clock line 95 in order to prevent input device conflicts between the jog dial panel 30 and the keyboard 50. Unless the keyboard controller 80 uses the keyboard data/clock line 95, the microcontroller 70 transmits the key scan code data to the system host.

Figure 3:
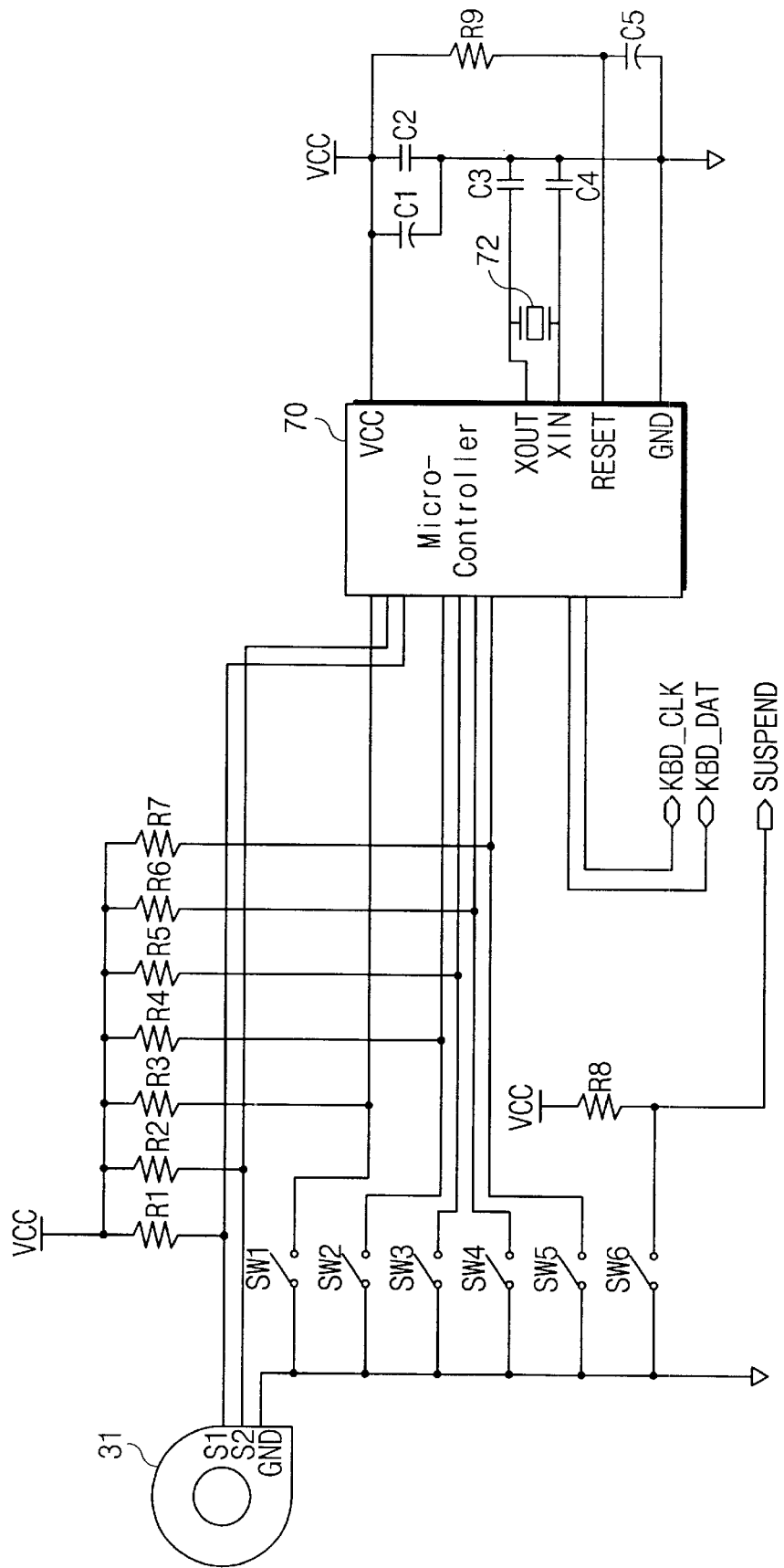
FIG. 3 is a schematic diagram of the jog dial panel shown in FIG. 2.

As shown in the detailed circuit diagram of FIG. 3, the jog dial 31 has two signal output terminals S1 and S2 and a ground terminal GND, in which each terminal comes into contact with the ground terminal stepwise whenever the shaft of the jog dial is rotated or clicked either in clockwise or counter-clockwise direction. Terminals S1 and S2 of the jog dial 31 are connected to input terminals of the microcontroller 70 by way of pull-up resistors R1 and R2 being applied by the same operating voltage Vcc. Also, the push button switches SW1, SW2, SW3, SW4, and SW5 are connected to other input terminals of the microcontroller 70 by way of pull-up resistors R3, R4, R5, R6, and R7 being applied by the operating voltage Vcc. Further, push button switches SW6 is connected to the suspend signal input terminal of the system host by way of a pull-up resistor R8 that is being applied by the operating voltage Vcc. The microcontroller 70 has two output terminals that output the key scan code data KBD_DAT and the keyboard clock signal KBD-CLK to the keyboard data/clock line 95 of the keyboard controller 80. In addition, the microcontroller 70 has an external clock generating circuit including a crystal oscillator 72, capacitors C1, C2, C3, C4, and C5, and a resistor R9.

In operation, when the jog dial 31 is rotated either in a clockwise direction or a counter-clockwise direction, two different signals are produced at the output terminals S1 and S2 of the jog dial 31. The signals sent to the microcontroller 70 have logical levels which are indicated in the Table 1 according to the rotational direction. Table 1 is shown below.

TABLE 1

|  | Terminal S1 | Terminal S2 |
| --- | --- | --- |
| clockwise direction | high (H) | high (H) |
| counter-clockwise direction | high (H) | low (L) |

The microcontroller 70 produces predefined key scan code in response to one of the signals fed from the output terminal S1 and S2 of the jog dial 31 and key button switches SW1 to SW5. The key scan code produced in the microcontroller 70 consists of mixed keyboard scan codes that is not used by the system host. Examples of the key scan codes corresponding to each switch are included in in Table 2. The Table 2 is shown below.

TABLE 2

| SW # | Name | System scan code | Keyboard scan code | description |
| --- | --- | --- | --- | --- |
| S1, S2 | Jog Dial | 64/79 | E0,64,E0,F0,64 | Rotate clockwise |
| S1, S2 | Jog Dial | 19/71 | E0,19,E0,F0,19 | Rotate counter-clockwise |
| SW1 | Select | 1C | 5A,F0,5A | Execute Program |
| SW2 | Exit | 6A/77 | E0,62,E0,F0,62 | Exit Program |
| SW3 | Menu | 7D/6A | E0,6A,E0,F0,6A | Invoke Jog Dial shell program control menu or |
| SW4 | Auto Recovery | 68/7C | E0,68,E0,F0,68 | Execute Auto Recovery program |
| SW5 | Study | 67/7B | E0,67,E0,F0,67 | Execute Study shell program |

Figure 4:
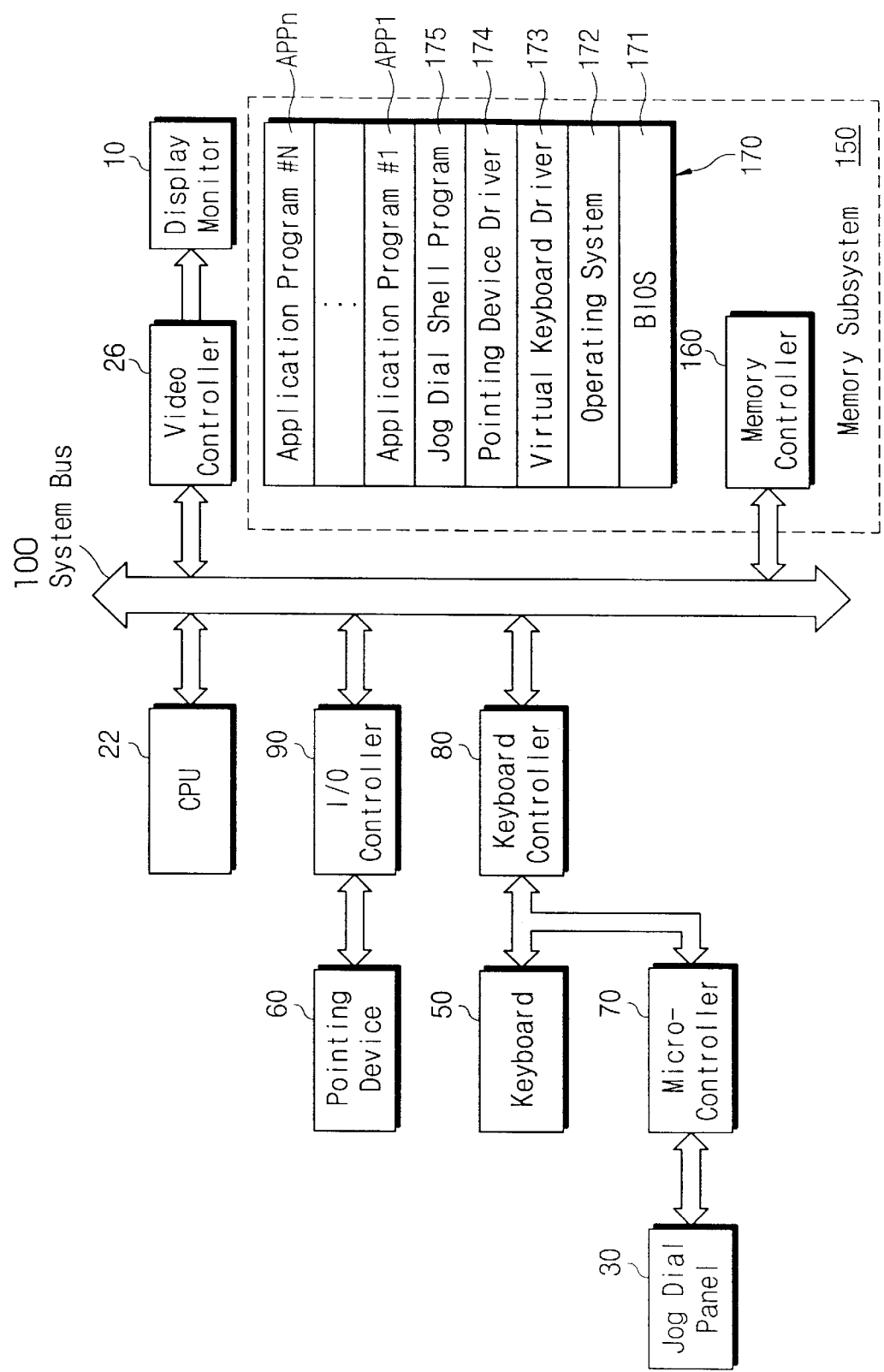
FIG. 4 is a block diagram of a computer system where jog dial panel of the present invention has been implemented.

FIG. 4 shows configuration of a computer system in which jog dial function of the present invention can be implemented. In particular, the computer system includes a memory subsystem 150 having a memory device for storing a jog dial shell program according to this invention. Basically, the computer system comprises a central processing unit (CPU) 22, an input/output (I/O) controller 90, a keyboard controller 80, a video controller 26, and a memory controller 160, all of which are coupled to the system bus 100. The jog dial panel 30 and microcontroller 70 are connected with the keyboard controller 80, where the keyboard 50 is connected by the keyboard data/clock line. Pointing device 60 such as a mouse is connected to the input/output controller 90. The display monitor 10 is connected with the video controller 26.

The memory subsystem 150 includes the memory controller 160 and at least one memory device 170. The memory device 170 has in its memory area a basic input/output system (BIOS) region 171, an operating system region 172, a virtual keyboard driver region 173, a pointing device driver region 174, the jog dial shell program region 175, and a plurality of application program regions APP1, . . . , APPn.

Preferably, in this embodiment, the operating system region 172 is loaded by the Windows(R) 95 operating system. In addition, basically the above-noted device drivers and the jog dial shell program is loaded in their memory regions through the computer booting process. When the jog dial shell program is loaded in the memory region, a program window relative to the jog dial shell program is displayed in the monitor 10.

Figure 5:
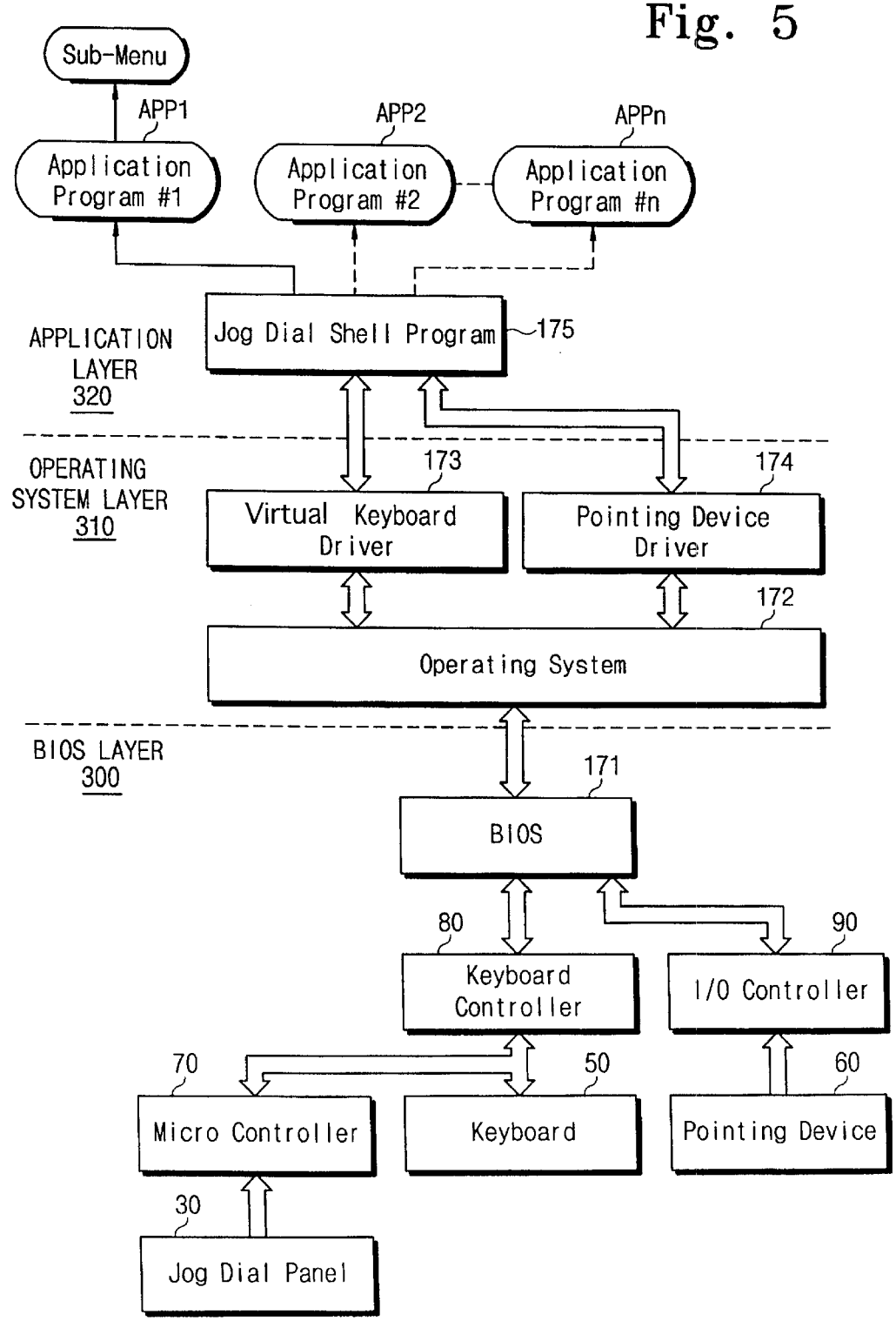
FIG. 5 is a diagram illustrating an interface model of the jog dial panel and the jog dial shell program for use in the computer system of FIG. 4.

FIG. 5 illustrates an interface model between the jog dial panel 30 and the jog dial shell program for use in the computer system of FIG. 4. As shown, the computer system has basic input output system (BIOS) layer 300, operating system layer 310, and application layer 320. The basic input output system layer 300 is provided for physical connection of the jog dial panel 30 and its microcontroller 70 with the computer's basic input output system (BIOS) 171 as well as connection of the input device such as keyboard 50 and pointing device 60 thereto via the keyboard controller 80 and input/output (I/O) controller 90. In this layer, signals generated in the jog dial panel 30 are supplied with the microcontroller 70 and the specific key scan code data produced in the microcontroller 70 is transmitted to the data line of the keyboard controller 80. Also, coordinate data or scan code data generated in the pointing device 60 are transmitted to the input/output controller 90. The basic input output system 171 provides the key scan code data fed from the keyboard controller 80 or the input/output controller 90 with the operating system 172.

Next, in the operating system layer 310, the operating system 172 interacts with the virtual keyboard driver 173 and the pointing device driver 174 such that the virtual keyboard driver 173 determines whether an inputted key scan code corresponds to the key operation of the jog dial panel 30. Further, the pointing device driver 174 determines whether an inputted key scan code corresponds to the mouse operation relative to the jog dial shell program 175. If it is found that the input key scan code data corresponds to the jog dial operation, a message corresponding to the key scan code data is transmitted to the jog dial shell program 175. Further, upon detection of the jog dial scan code, the operating system 172 invokes the jog dial shell program 175 and displays it in a pop-up window on the foreground of the screen.

In the application layer 320, the jog dial shell program 175 receives the message from the operating system 172 to perform the corresponding function as to the rotation of the jog dial 31 or pressing of the button switches SW1, SW2, and SW3. The jog dial shell program 175 is associated with a plurality of application programs APP1, APP2, . . . , APPn. Further, submenu of each application program is associated with the jog dial shell program 175.

The jog dial shell program 175 is thus displayed as a pop-up window on the monitor screen, supported by the Windows 95 operating system 172 and the basic input output system 171, as shown in FIG. 6. The jog dial shell program window 200 displayed on the top left side of the screen 110 basically consists of a title bar 210 and a program selection menu window 220. This menu window 220 has a dial-like form extending along the horizontal side thereof and divided into three sections 220a, 220b, and 220c. Each section is designated by names of an application program (a menu item) that is being registered in the shell program 175, which will be described later. For example, "Internet" for an Internet connection program, "Wordpro" for a word processing program, and "PC Comm" for a PC communication program, are each displayed as the menu item in each of the section from left to right sides. The menu item "Wordpro" being located at the center section 220b is regarded as a chosen program in the menu window 220.

Figure 7A:
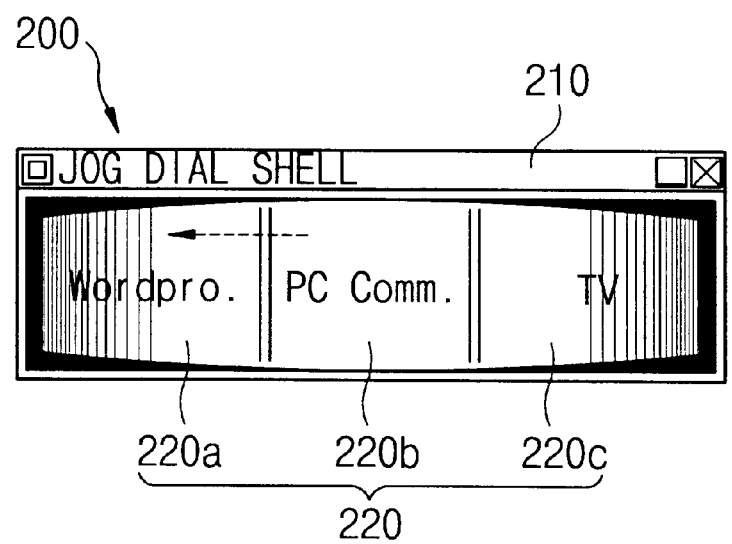
FIGS. 7A and 7B depict the jog dial shell program window displayed in the computer monitor screen and show the jog dial shell window varying with the rotational direction of the jog dial, in accordance with the principles of the present invention.
Figure 7B:
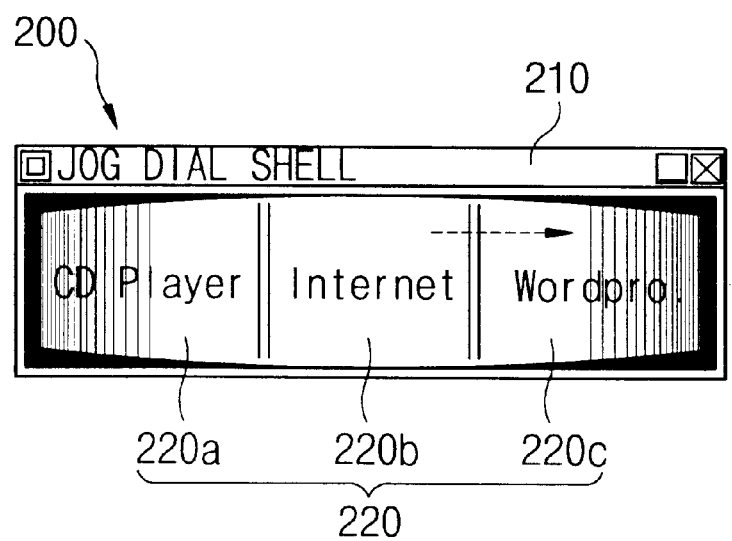

If the jog dial 31 is rotated by one click in the counter-clockwise direction, the program menu sections 220a, 220b, and 220c of the menu window 220 are moved successively toward the left direction as shown in FIG. 7a. With this, another menu item "TV" is newly displayed at the right side section 220c. On the other hand, if the jog dial 31 is rotated by one click in the clockwise direction, the program menu sections 220a, 220b, and 220c of the menu window 220 are moved successively toward the right direction one by one as shown in FIG. 7b. With the result, another menu item "CD Player" is newly displayed at the left side menu section 220a. In this case, the "Internet" menu item located at the center section 220b is regarded as a chosen program.

Further, the above-noted program selection menu 220 of the jog dial shell program 175 has a loop type data format as illustrated in FIG. 8. The jog dial shell program 175 is designed to register the menu item into each of program registration sections (230a, 230b, 230c, . . . ) of the loop type data format 230. Registration of the program is performed sequentially along the loop, without limitation of the number of programs. The loop type data format shown in FIG. 8, in combination with software, allows an unlimited number of menu items to be included in the present invention. Menu items can be added, deleted and edited, as described below. Other menu items could be "Spreadsheet" or "Calculator" or "Virus Scanning Utility" or "Encyclopedia" or any application program.

In the activation state of the jog dial shell program 175, for example, three program names registered in the sections 230a, 230b, and 230c are retrieved at once. According to the rotation of the jog dial 31, the data to be retrieved is shifted one by one toward the next location. Among the three selected programs, the center part thereof is designated by the chosen program.

Figure 9:
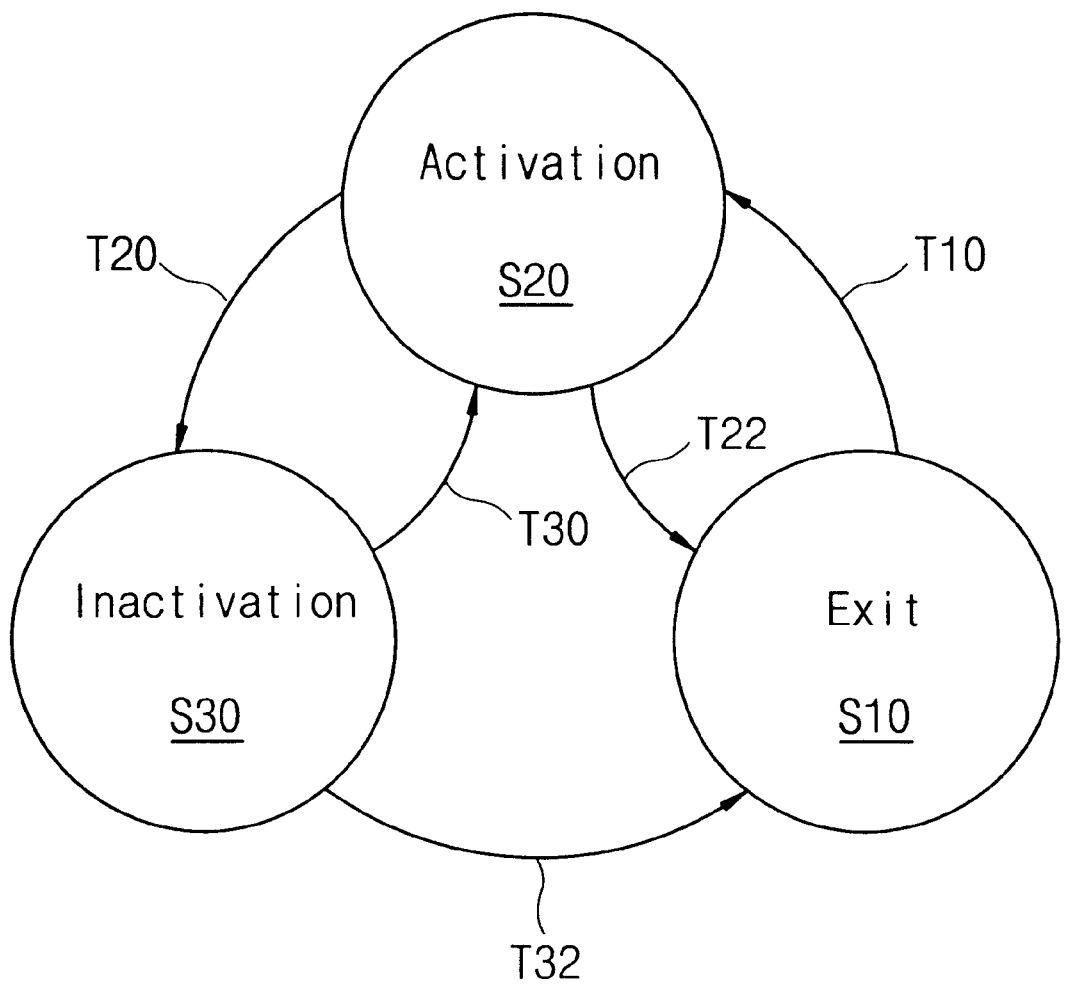
FIG. 9 is a state diagram of the jog dial shell program, in accordance with the principles of the present invention.

FIG. 9 shows a state diagram of the jog dial shell program 175. The jog dial shell program 175 has three states that are Exit state (S10), Activation state (S20), and Inactivation state (S30), as like in the common operating system. If the jog dial shell program 175 is executed from the exit state, it is changed to the activation state as denoted by an arrow T10. Further, in the activation state, if there is no input message during a preset time, it is changed to the inactivation state as denoted by an arrow T20. Other state transition is similar to the ordinary case of a Windows 95 application program. A change from the activation state S20 to the exit state S10 is denoted by the arrow T22. A change from the inactivation state S30 to the exit state S10 is denoted by the arrow T32. A change from the activation state S20 to the activation state S20 is denoted by the arrow T30.

Figure 10:
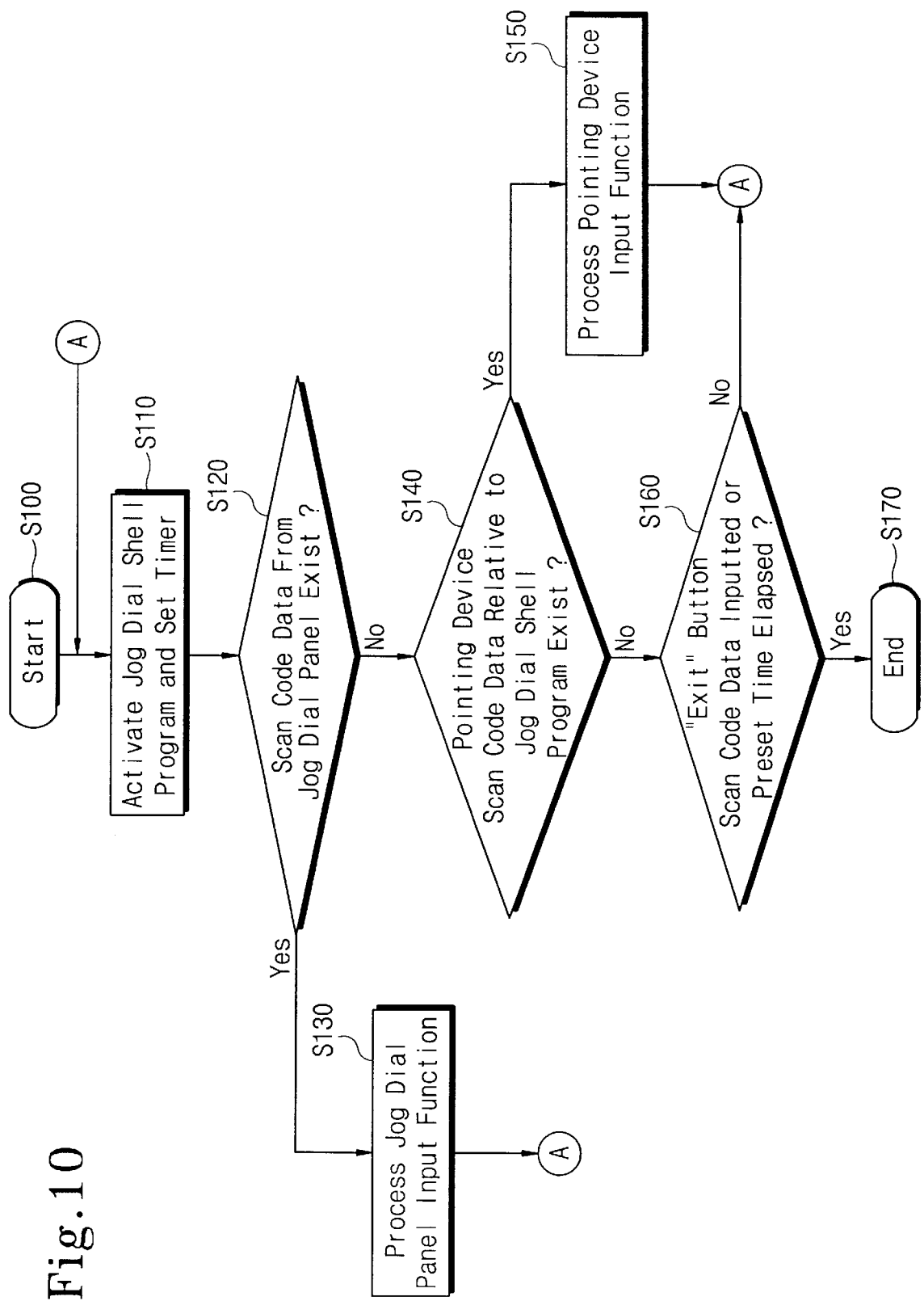
FIG. 10 is a flow diagram for depicting operation of the computer system in which inputs from the jog dial panel and pointing device are handled, in accordance with the principles of the present invention.

Referring to FIG. 10, there is shown a flow diagram of operation of the computer system, in which inputs from the jog dial panel and pointing device are handled. At step S100, the computer system of FIG. 4 is started to boot up and loading of the Windows 95 operating system is finished. Next, at step S110, the jog dial shell program 175 is executed to be loaded into a memory region. A timer is then set to count the activation time of the shell program 175 by reading out present time information stored in the system basic input output system. This step S110 can be applied to a state transition of the shell program 175 from the inactivation state to the activation state.

Figure 11:
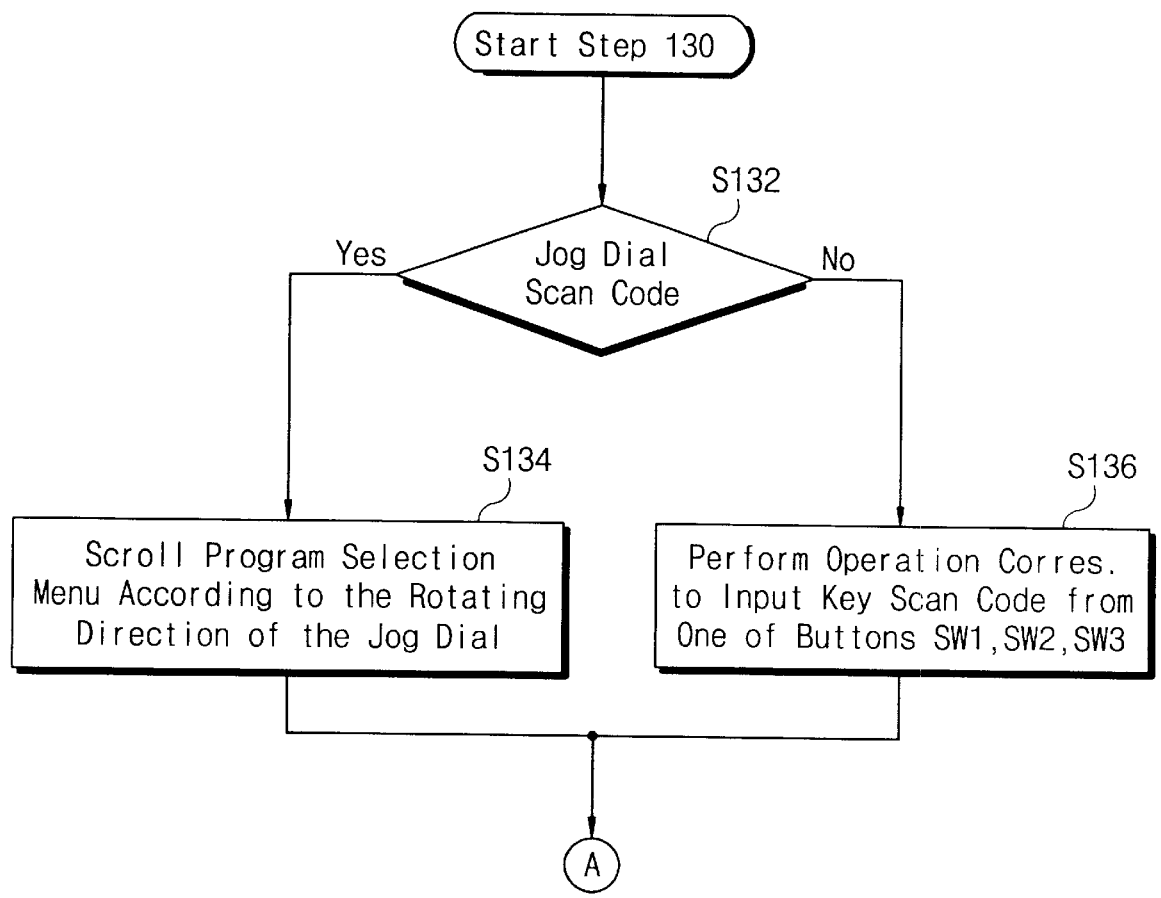
FIG. 11 is a flow diagram of the computer operation for handling the input of the jog dial panel, in accordance with the principles of the present invention.

At step S120, a determination is made whether a key scan code data is inputted from the jog dial panel 30. If the input exists, it proceeds to step S130 to perform operation corresponding to the key scan code data from the jog dial panel 30. The detailed operation for handling the input of the jog dial panel is shown in FIG. 11. Note that S132, S134, and S136 are substeps included within step S130.

In the FIG. 11, at substep S132, a further determination is made whether the input key scan code corresponds to the predefined key scan code relative to the jog dial 31. If the result of substep S132 is that it is the jog dial key scan code, then substep S134 is performed. At substep S134, a command for scrolling the menu item of the jog dial shell program window 220 is issued. If the result of substep S132 is that it is not the jog dial key scan code, then substep S136 is performed. At substep S136, issued is a command for performing operation corresponding to input key scan code from one of the push buttons SW1, SW2, and SW3. As previously mentioned, if the key scan code corresponding to the button switch SW1 is inputted, executing of an application program chosen by the jog dial 31 is performed. Further, in response to the input from button switches SW2 and SW3, ending of the executed program and invoking of a main menu of the executed program are performed, respectively. After substep 134 is performed, the processing returns to step S110. After substep 136 is performed, the processing returns to step S110.

Alternatively, in FIG. 10, at step S120, if the key scan code data is not the one that inputted from the jog dial panel 30, further determination is made at step S140 whether the input key scan code data corresponds to a mouse scan code relative to the jog dial shell program 175. If the result of step S140 is that it is the mouse scan code data, then it proceeds to step S150 to process the corresponding mouse input function relative to the jog dial shell program 175. Processing of the mouse scan code data will be described later with reference to FIG. 12 to FIG. 14. After step S150 is performed, the processing returns to step S110.

Alternatively, if the result of step S140 is that it is not the mouse scan code data, then it proceeds to step S160 to determine whether the "Exit" button key scan code data is inputted or a preset time interval elapsed since the activation state of the jog dial shell program. If the key scan code data corresponding to the "Exit" button SW2 is inputted, the jog dial shell program enters the inactivation state at step S170. If it is found that the preset time interval has elapsed the jog dial shell program also enters the inactivation state also at step S170. The jog dial shell program shall maintain the activation state until the "Exit" button switch SW2 is pressed or the preset time elapsed.

Figure 12A:
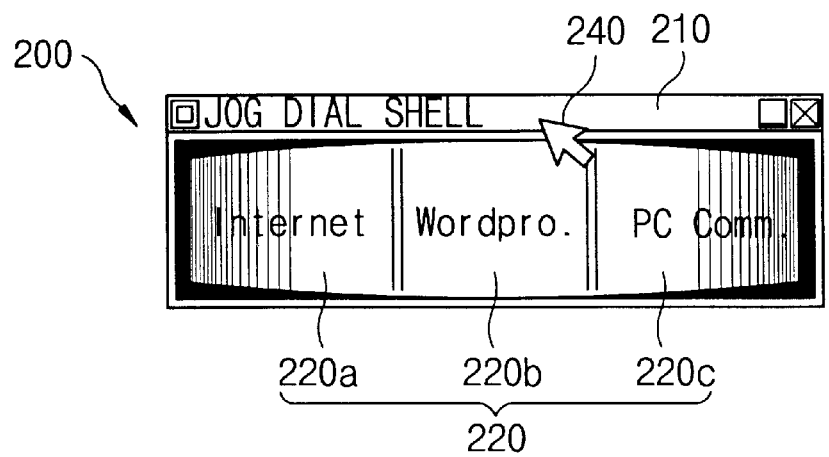
FIGS. 12A and 12B are views showing variation of the form of the program selection menu, which varies from rotational type to pull-down menu by the clicking operation of a mouse, in accordance with the principles of the present invention.
Figure 12B:
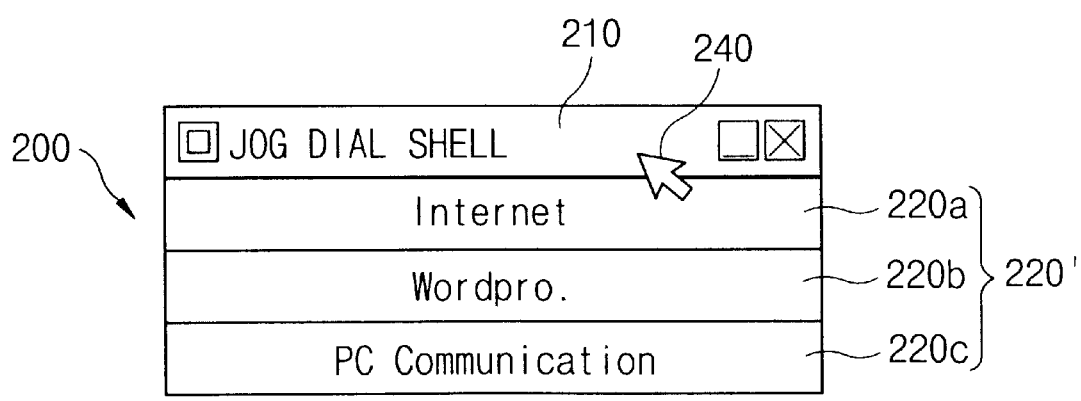
Figure 14:
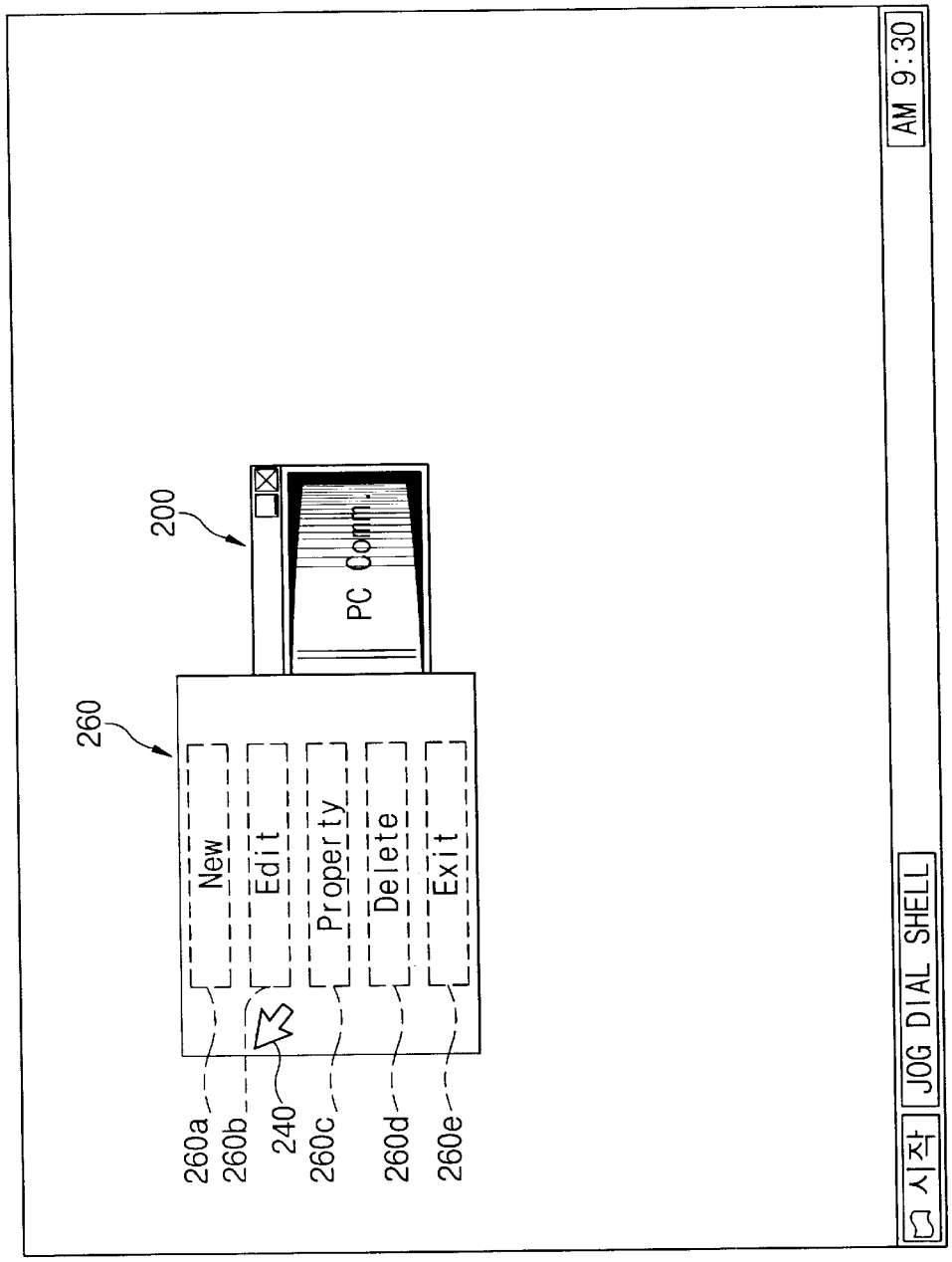
FIG. 14 is a view depicting a control menu of the jog dial shell program, in accordance with the principles of the present invention.

The jog dial shell program 175 responds to input of the mouse scan code data as shown in FIG. 12 to FIG. 14. In FIGS. 12A and 12B, the jog dial shell program 175 varies the form of the program selection menu 220 from the rotational one to the pull-down menu. In FIG. 12A, a mouse pointer 240 is located on the title bar 210 and double-clicking is effected. In FIG. 12B, there is shown the changed program selection menu 220' of the pull-down menu form. If the double-clicking operation is effected again in the title bar 210, the program selection menu 220' returns to the original rotational form as shown in FIG. 12A.

Further, by using the drag and drop function of the mouse supported by the Windows 95 operating system, the jog dial shell program 175 adds a new application program into the program selection menu 220. As shown in FIG. 13, by using the mouse pointer 240, dragging a program icon "PCDic" 250 and dropping it to the program selection menu window 220 enables registration of the corresponding program in the menu item. Information of the new menu item is registered into a program registration section of the loop type data format 230 shown in FIG. 8.

Alternatively, the registration of a new program can be effected through the control menu of the jog dial shell program window 200 as shown in FIG. 14. This control menu 260 is displayed on the screen in response to the key scan code input of the "Menu" button switch SW3. The control menu 260 is also displayed as the mouse pointer 240 is placed within the shell program window 200 and clicking of the right button is effected. As shown in FIG. 14, the control menu 260 may consist of five menu items, that is New, Edit, Property, Delete, and Exit, denoted by reference numerals 260a to 260e. Other menu items could be included in the control menu 260. The "New" menu item enables the registration of a new program menu item. The "Edit" menu item enables editing of the order of the registered program selection menu 220. In addition, "Property" menu item enables change of the registered program information, for example information on the command line or work directory.

As described in the above, the jog dial panel and the corresponding shell program of the invention provides an effective user interface since selecting, executing, and ending of a desired application program registered in the shell program are possible in a more convenient manner through operation of the jog dial and the key button switches. Further, registration of new program menu item as well as edition of the registered program menu are possible through the mouse operation.

Figure 15:
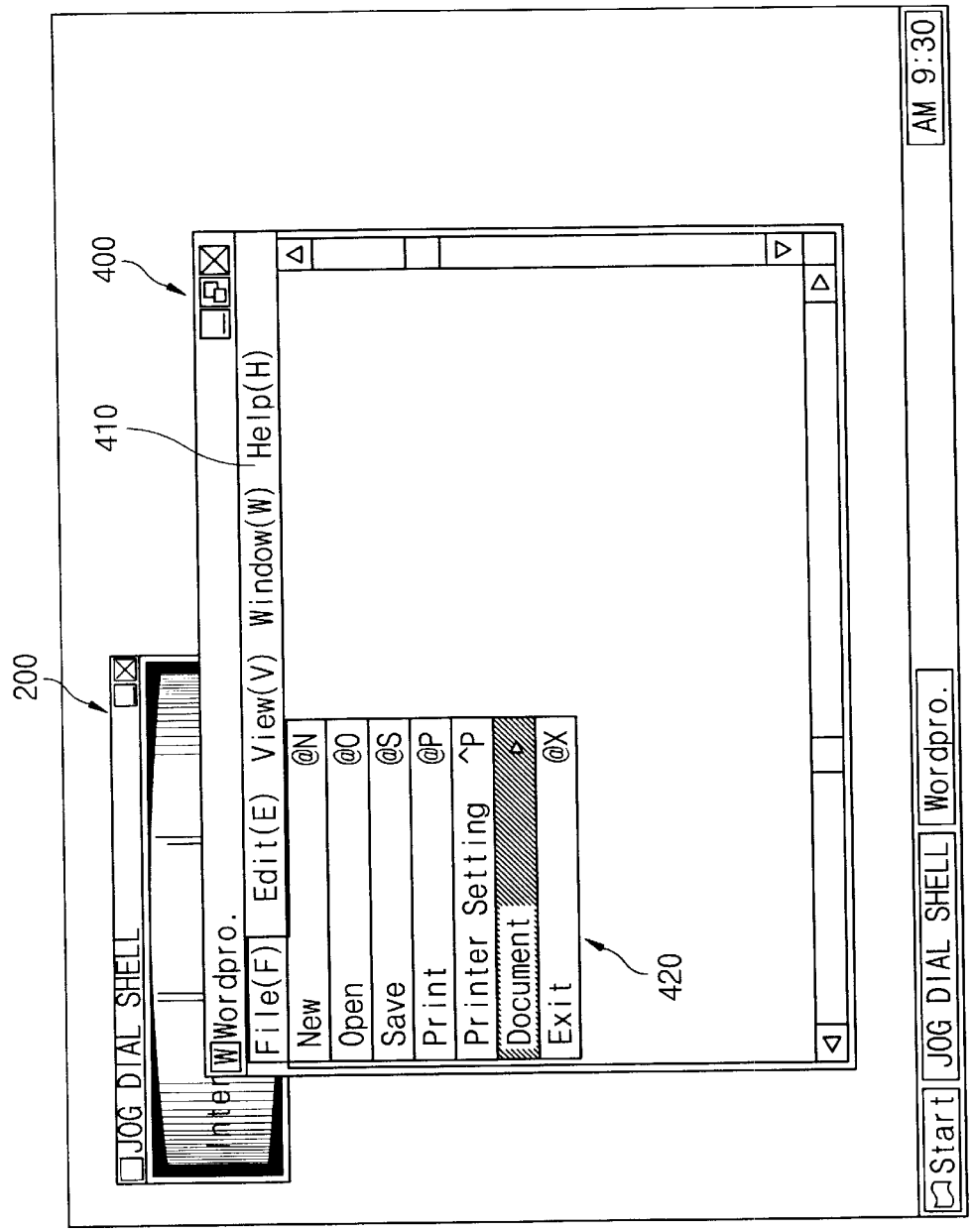
FIG. 15 is a view depicting a sub-menu of an application program appeared when the program, supporting the jog dial shell program, has been executed and the menu button of the jog dial panel is operated, in accordance with the principles of the present invention.
Figure 16A:
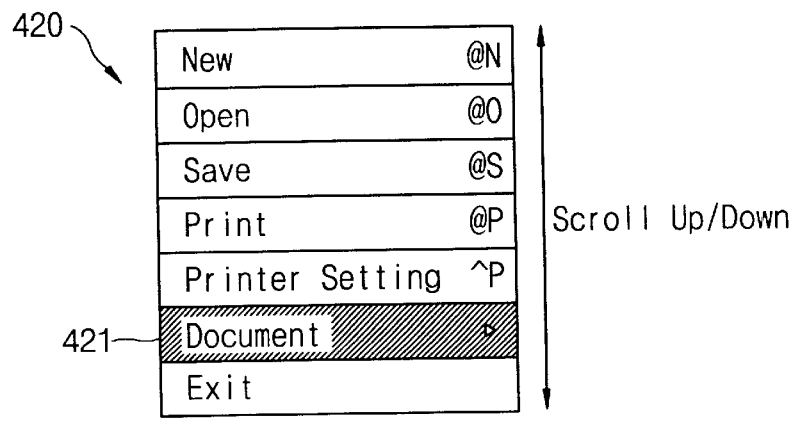
FIGS. 16A and 16B are views for depicting a scroll up and down operation for the submenu of FIG. 15 and a submenu selection operation performed by the jog dial panel, in accordance with the principles of the present invention.
Figure 16B:
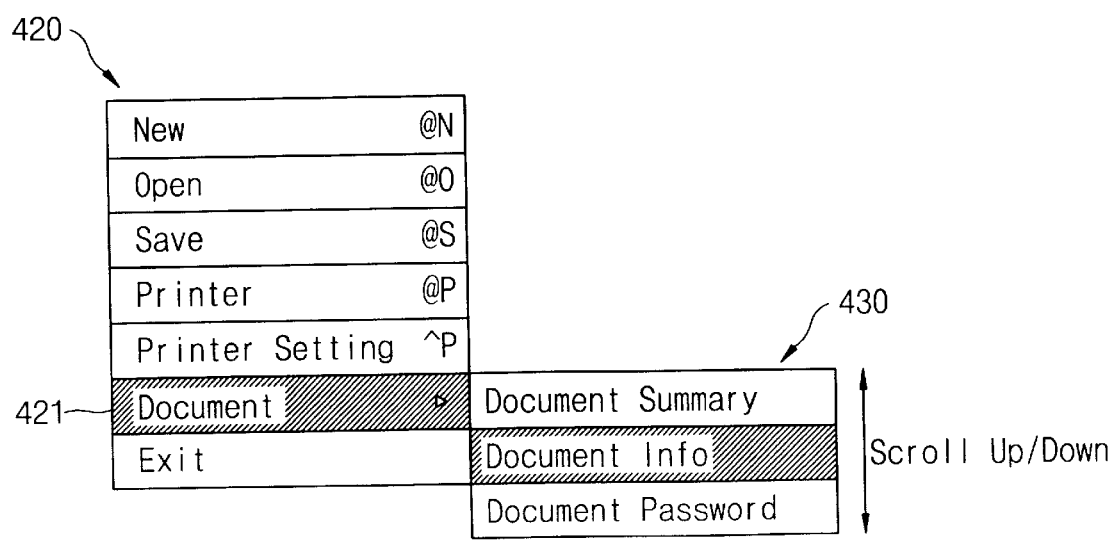

FIG. 15 shows selection process of a menu of an application program 400 in accordance with the present invention. If the program 400 has a plurality of menus 410 and their sub-menus 420, and if the program is designed to support the jog dial shell program of the invention, the menu and submenu of the program can be selected after execution of the program 400 through the jog dial panel 30. That is, in the activation state of the program, if the Menu button switch SW3 is pressed, the first menu (for example, "File") in the menu bar 410 is selected and its submenu 420 is displayed in a pull-down manner. Then, by rotating the jog dial 31 in the clockwise/counter-clockwise direction, the menu items of the submenu 420 are scrolled up and down by a selection bar as shown in FIG. 16A. Selection of a submenu item 421 "Document" can be effected by pressing the Enter button SW1. Further, if the selected submenu 421, for example "Document", has further menu items as shown in FIG. 16B, scrolling of the further menu items 430 can be effected by rotating the jog dial 31 in the clockwise/counter-clockwise direction. Thus, scrolling up and down operation relative to submenu of an application and to the submenu items can be performed by the jog dial panel.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
   a panel including at least one switch unit, said at least one switch unit outputting at least one switch signal in response to a switching of said at least one switch unit, said at least one switch signal corresponding to a first operation selected from among a plurality of operations;
   a processing unit receiving at least one keyboard scan code, said at least one keyboard scan code corresponding to said at least one switch signal;

a video display conveying varying visual information, said visual information corresponding to said plurality of operations, said first operation, and said switching of said at least one switch unit; and a memory unit being coupled to said processing unit and storing a routine, said routine being selectively activated and inactivated;

when said routine is in an activated state, said processing unit outputting a command signal in response to said at least one keyboard scan code to perform said first operation, said routine entering an inactivated state without user intervention when said at least one switch unit does not output said at least one switch signal for a present time interval.

2. The apparatus of claim 1, wherein said apparatus corresponds to a computer system and said panel is mounted in a front bezel of the computer main body.

3. The apparatus of claim 1, said memory unit further comprising a memory subsystem including a memory controller and at least one memory device, said at least one memory device having a basic input/output system region, an operating system region, a virtual keyboard driver region, a pointing device driver region, and a routine region storing said routine.

4. The apparatus of claim 1, wherein said plurality of operations includes a plurality of application programs and a submenu of each of said plurality of application programs.

5. The apparatus of claim 4, wherein said plurality of application programs are registered in program registration sections in a loop type data format within said routine.

6. The apparatus of claim 1, further comprising:
at least one new operation being added to said plurality of operations by a drag-and-drop process when an image corresponding to said new operation is dragged from a first region of said video display and is dropped at a predetermined region of said video display;

said at least one switch unit including a rotary switch, said visual information conveyed by said video display including a visual form corresponding to said rotary switch, the image corresponding to said new operation being an icon displayed at the first region of said video display, the first region of said video display being separately located away from said visual form, the predetermined region of the video display corresponding to said visual form.

7. The apparatus of claim 6, said plurality of operations corresponding to a plurality of application programs, said plurality of application programs being registered in program registration sections in a loop type data format within said routine, said new operation corresponding to a new application program and being registered in the program registration sections in the loop type data format when the image is dropped at the predetermined region of said video display.

8. The apparatus of claim 1, said routine entering the inactivated state when said at least one switch signal corresponds to an instruction for said routine to enter the inactivated state.

9. The apparatus of claim 8, said at least one switch unit including a rotary switch and at least one push button switch.

10. The apparatus of claim 1, said routine entering the activated state when the apparatus is powered on.

11. The apparatus of claim 1, said routine entering the activated state when said at least one switch signal corresponds to an instruction for said routine to enter the activated state.

12. The apparatus of claim 1, further comprising:
a keyboard being connected with said processing unit and outputting keyboard data;

a keyboard controller receiving said keyboard data, said keyboard controller transmitting first key scan code data to said processing unit in response to said keyboard data, said first key scan code data corresponding to said keyboard data; and a microcontroller receiving said at least one switch signal from said at least one switch unit, said microcontroller outputting second key scan code data to said processing unit in response to said at least one switch signal, said second key scan code data corresponding to said at least one keyboard scan code.

13. The apparatus of claim 12, wherein said microcontroller identifies said switching of said at least one switch unit.

14. The apparatus of claim 12, further comprising a keyboard data/clock line being disposed to connect said keyboard controller and said microcontroller to said processing unit, said keyboard controller outputting said first key scan code data on said keyboard data/clock line, said microcontroller outputting said second key scan code data on said keyboard data/clock line, said microcontroller preventing conflicts between said at least one switch unit and said keyboard by outputting said second key scan code data on said keyboard data/clock line when said keyboard controller is not outputting said first key scan code data on said keyboard data/clock line, said keyboard controller being disposed between said keyboard and said processing unit, said microcontroller being disposed between said at least one switch unit and said processing unit.

15. The apparatus of claim 14, wherein said at least one switch unit further comprises a rotary switch and at least one push button switch.

16. The apparatus of claim 15, wherein said rotary switch includes at least two signal output terminals, said at least two signal output terminals outputting a plurality of direction signals corresponding to a rotation direction of said rotary switch, said rotation direction being selected from a clockwise direction and a counter-clockwise direction.

17. The apparatus of claim 15, wherein said rotary switch incorporates said at least one push button switch in a center of said rotary switch.

18. The apparatus of claim 15, wherein said panel further comprises a first push button switch adjacent to said rotary switch for performing a specific function of said processing unit, said first push button switch being among said at least one push button switch.

19. The apparatus of claim 15, wherein said visual information conveyed by said video display includes a visual form corresponding to said rotary switch.

20. The apparatus of claim 19, wherein said visual form is divided into three sections, each one of said three sections being designated by a name of a corresponding operation selected from among said plurality of operations.

21. The apparatus of claim 20, wherein said plurality of operations corresponds to a plurality of application programs registered in said routine.

22. The apparatus of claim 14, said at least one switch unit including a rotary switch and at least one push button switch, the apparatus corresponding to a computer system with said panel being mounted in a front bezel of the computer main body.

23. A method, comprising:
determining when a signal is output from a panel, said panel including a rotary switch and at least one push button switch;

varying visual data displayed at a video display, said
varying of said visual data being performed in response
to a rotational movement of said rotary switch when
said signal corresponds to said rotary switch, said
visual data corresponding to a plurality of application
programs;

performing a function corresponding to said at least one
push button switch when said signal corresponds to
said at least one push button switch;

said at least one push button switch being designated for
execution of a selected application program, said
selected application program being selected from
among said plurality of application programs by operation of said rotary switch; and generating first data in response to said signal, said first
data corresponding to at least one scan code of a
keyboard, transmitting said first data to a processing
unit, said processing unit controlling said varying of
said visual data.

24. The method of claim 23, further comprising adding at least one new application program to said plurality of application programs by dragging an image corresponding to said at least one new application program from a first region of said video display and then dropping the image at a predetermined region of said video display, said first region being separately located from said predetermined region.

25. A method, comprising:
selecting an application program from among a first
application program and a second application program,
said selecting being executed by operating at least a
first one switch selected from among a rotary switch
and a plurality of push button switches connected to a
computer system;

determining when a signal is output from a panel of said
computer system, said panel including said rotary
switch and said push button switches, said signal being
generated in response to said selecting, said signal
corresponding to at least one keyboard scan code;

varying visual data of a menu displayed at said video
display in response to a rotational movement of said
rotary switch when said signal corresponds to said
rotary switch, said varying of said visual data being
executed to facilitate a selecting of a command from
among a plurality of commands for executing said
selected application program, said visual data of said
menu including said plurality of commands; and performing a selected command corresponding to a
selected one of said push button switches when said
signal corresponds to said selected one push button
switch, said selected one push button switch being
designated for execution of said selected command,
said panel being mounted on a front bezel of a main
body of said computer system.

26. The method of claim 25, further comprising:
activating a routine stored in a memory, said routine being
in an activated state in response to said activating;

said varying, performing, and selecting of said application
program being executed only when said routine is in
the activated state; and inactivating said routine when said selecting of said
application program is not executed during a preset
time interval.

27. The method of claim 26, further comprising:
operating at least a second one switch selected from
among said rotary switch and said push button
switches, said second one switch corresponding to an
instruction to inactivate said routine, and inactivating
said routine in response to said operating of said second
one switch;

said activating of said routine being performed without
user intervention when said computer system is powered on;

operating at least a third one switch selected from among
said rotary switch and said push button switches, said
third one switch corresponding to an instruction to
activate said routine, and activating said routine in
response to said operating of said third one switch;

outputting keyboard data from a keyboard to a processing
unit, said keyboard and processing unit being connected with said computer system;

transmitting first key scan code data from a keyboard
controller to said processing unit, said first key scan
code data corresponding to said keyboard data; and in response to said operating of said first one switch,
transmitting second key scan code data from a microcontroller to said processing unit, said second key scan
code data corresponding to said at least one keyboard
scan code.

28. A method, comprising:
executing a shell program stored in a memory, the shell
program being in an activated state in response to said
executing of said shell program;

when said shell program is in the activated state, operating
a first switch to transmit a first switch signal, said first
switch being selected from among a rotary switch and
at least one push button switch mounted on a panel of
a computer system, said first switch signal corresponding to at least one keyboard scan code;

executing an application program in response to said
transmitting of said first switch signal;

selecting a first menu item from among a plurality of
displayed menu items of a first menu of said executed
application program according to a rotational movement of said rotary switch;

executing said first menu item by pressing said at least one
push button switch, wherein said at least one push
button switch is designated for execution of said first
menu item selected by said rotary switch; and terminating said shell program without user intervention
when said operating of said first switch is not performed during a preset time interval, the shell program
being in an inactivated state in response to said terminating of said shell program.

29. The method of claim 28, further comprising:
operating a second switch selected from among said
rotary switch and said at least one push button switch,
said second switch corresponding to an instruction to
terminate said shell program; and terminating said shell program in response to said operating of said second switch.

30. The method of claim 28, said executing of said shell program being performed without user intervention when said computer system is powered on.

31. The method of claim 28, further comprising:
operating a second switch selected from among said
rotary switch and said at least one push button switch,
said second switch corresponding to an instruction to
execute said shell program;

said executing of said shell program being performed in
response to said operating of said second switch.

32. The method of claim 28, further comprising:

outputting keyboard data from a keyboard to a processing unit, said keyboard and processing unit being connected with said computer system;

transmitting first key scan code data from a keyboard controller to said processing unit, said first key scan code data corresponding to said keyboard data; and in response to said operating of said first switch, transmitting second key scan code data from a microcontroller to said processing unit, said second key scan code data corresponding to said at least one keyboard scan code.

33. The method of claim 32, said executing of an application program corresponding to executing a selected application program selected from among a plurality of available application programs, said panel being mounted on a front bezel of a main body of said computer system.

34. The method of claim 33, further comprising:

selecting an image displayed at a first region of a video display connected to said computer system, said image corresponding to a new application program;

dragging the image from the first region; and dropping the image at a separately located predetermined region of said video display, said dropping of the image adding said new application program to said plurality of available application programs.

35. The method of claim 34, said selected application program being selected from among said plurality of available application programs according to one selected from among a movement of a pointer of an input device at said predetermined region of said video display and a rotational movement of said rotary switch.

36. The method of claim 35, said input device corresponding to a mouse in communication with said computer system.

37. The method of claim 33, said selected application program being selected from among said plurality of available application programs according to a rotational movement of said rotary switch.

38. The method of claim 32, said transmitting of said first key scan code data from said keyboard controller to said processing unit being on a keyboard data/clock line, said transmitting of said second key scan code data from said microcontroller to said processing unit being on said keyboard data/clock line, said microcontroller preventing conflicts between said panel and keyboard by performing said transmitting of said second key scan code data on said keyboard data/clock line only when said first key scan code data is not being transmitted on said keyboard data/clock line.

39. The method of claim 38, wherein said executing of said first menu item corresponds to displaying a first submenu, said rotary switch being utilized to select a second menu item from among a second plurality of displayed menu items of said first submenu.

40. The method of claim 39, said executing of an application program corresponding to executing a selected application program selected from among a plurality of available application programs, said panel being mounted on a front bezel of a main body of said computer system.

41. The method of claim 40, further comprising:

selecting an image displayed at a first region of a video display connected to said computer system, said image corresponding to a new application program;

dragging the image from the first region; and dropping the image at a separately located predetermined region of said video display, said dropping of the image adding said new application program to said plurality of available application programs.

42. The method of claim 41, said selected application program being selected from among said plurality of available application programs according to a rotational movement of said rotary switch.

\* \* \* \* \*